(12) United States Patent
Venugopal et al.

(10) Patent No.: US 11,510,192 B2
(45) Date of Patent: Nov. 22, 2022

(54) CONTROL CHANNEL RESOURCE GROUPING AND SPATIAL RELATION CONFIGURATION

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Somerville, NJ (US); Jung Ho Ryu, Fort Lee, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,590

(22) Filed: Feb. 27, 2020

(65) Prior Publication Data
US 2020/0351905 A1 Nov. 5, 2020

Related U.S. Application Data

(60) Provisional application No. 62/842,375, filed on May 2, 2019.

(51) Int. Cl.
*H04W 72/04* (2009.01)
*H04L 5/00* (2006.01)
*H04W 16/12* (2009.01)

(52) U.S. Cl.
CPC ......... *H04W 72/044* (2013.01); *H04L 5/0023* (2013.01); *H04L 5/0053* (2013.01);
(Continued)

(58) Field of Classification Search
CPC ............. H04W 72/044; H04W 72/042; H04W 72/0413; H04W 72/0446; H04W 72/0453;
(Continued)

(56) References Cited

U.S. PATENT DOCUMENTS

2014/0177601 A1\* 6/2014 Nishio .................. H04W 72/02
370/332
2019/0261380 A1\* 8/2019 Iyer ...................... H04B 7/0695
(Continued)

FOREIGN PATENT DOCUMENTS

CN 110034876 A 7/2019
EP 3826196 A2 5/2021
(Continued)

OTHER PUBLICATIONS

International Search Report and Written Opinion—PCT/US2020/020286—ISAEPO—dated Jun. 2, 2020.
(Continued)

*Primary Examiner* — Joshua Kading
(74) *Attorney, Agent, or Firm* — Patterson+ Sheridan, L.L.P.

(57) ABSTRACT

Certain aspects of the present disclosure provide techniques for control channel resource grouping and spatial relation configuration. Aspects of the present disclosure provide a method of wireless communication by a user equipment (UE). The method generally includes receiving an indication of one or more groupings of one or more control channel resources within a configured bandwidth. Each grouping is associated with a spatial relation. The UE applies a spatial relation for a control channel transmission using one or more control channel resources in a grouping of the one or more groupings. The grouping is associated with the spatial relation.

33 Claims, 13 Drawing Sheets

(52) U.S. Cl.
CPC ........... *H04L 5/0092* (2013.01); *H04W 16/12* (2013.01); *H04W 72/042* (2013.01); *H04W 72/0413* (2013.01); *H04W 72/0493* (2013.01)

(58) Field of Classification Search
CPC .. H04W 72/046; H04W 16/12; H04L 5/0053; H04L 5/0023; H04L 5/0092; H04L 5/0025; H04L 5/0037; H04L 5/0091–0094
See application file for complete search history.

(56) References Cited

U.S. PATENT DOCUMENTS

| | | | |
|---|---|---|---|
| 2019/0312698 A1* | 10/2019 | Akkarakaran | H04L 5/0091 |
| 2020/0053721 A1* | 2/2020 | Cheng | H04W 72/0413 |
| 2020/0092814 A1* | 3/2020 | Zhou | H04L 5/00 |
| 2020/0119778 A1* | 4/2020 | Grant | H04L 5/0053 |
| 2020/0305168 A1* | 9/2020 | Liou | H04L 5/0053 |
| 2020/0314829 A1* | 10/2020 | Venugopal | H04W 16/28 |
| 2020/0314860 A1* | 10/2020 | Zhou | H04W 72/14 |
| 2021/0329625 A1* | 10/2021 | Wang | H04B 7/06 |

FOREIGN PATENT DOCUMENTS

| | | |
|---|---|---|
| WO | 2013178187 A2 | 12/2013 |
| WO | 2017049463 A1 | 3/2017 |
| WO | 2018059529 A1 | 4/2018 |
| WO | 2018068208 A1 | 4/2018 |
| WO | 2019093823 A1 | 5/2019 |
| WO | 2019138528 A1 | 7/2019 |
| WO | 2019140639 A1 | 7/2019 |
| WO | 2019190377 A1 | 10/2019 |
| WO | 2019203711 A1 | 10/2019 |
| WO | 2020042981 A1 | 3/2020 |
| WO | 2020065596 A1 | 4/2020 |
| WO | 2020143735 A1 | 7/2020 |
| WO | 2020148903 A1 | 7/2020 |
| WO | 2020180606 A1 | 9/2020 |
| WO | 2020185579 A1 | 9/2020 |
| WO | 2020216209 A1 | 10/2020 |
| WO | 2020246819 A1 | 12/2020 |
| WO | 2021022398 A1 | 2/2021 |
| WO | 2021072619 A1 | 4/2021 |
| WO | 2021081844 A1 | 5/2021 |
| WO | 2021083359 A1 | 5/2021 |
| WO | 2021159460 A1 | 8/2021 |

OTHER PUBLICATIONS

LG Electronics: "Updated Feature Lead Summary of Enhancements on Multi-beam Operations", 3GPP Draft, 3GPP TSG RAN WG1 Meeting #96bis, R1-1905838 R1#96BIS Updated Feature Lead Summary of MB1 After Thursday Offline Session, 3rd Generation Partnership Project (3GPP), Mobile Competence Centre, 650, Route Des Lucioles, F-06, vol. RAN WG1, No. Xi'an, China, Apr. 8, 2019-Apr. 12, 2019, Apr. 15, 2019 (Apr. 15, 2019), XP051707884, 24 Pages, Retrieved from the Internet: URL:http://www.3gpp.org/ftp/tsg%5Fran/WG1%5FRL1/TSGR1%5F96b/Docs/R1%2D1905838%2Ezip [retrieved on Apr. 15, 2019] p. 9-p. 11 p. 23.

ZTE: "Details of Latency and Overhead Reduction for Beam Management", 3GPP Draft, 3GPP TSG RAN WG1 #96bis, R1-1904022 Details of Latency and Overhead Reduction for Beam Management, 3rd Generation Partnership Project (3GPP), Mobile Competence Centre, 650, Route Des Lucioles, F-06921 Sophia-Antipolis Cede, vol. RAN WG1, No. Xi'an, China, Apr. 8, 2019-Apr. 12, 2019, Apr. 7, 2019 (Apr. 7, 2019), XP051699427, 6 Pages, Retrieved from the Internet: URL:http://www.3gpp.org/ftp/Meetings%5F3GPP%5FSYNC/RAN1/Docs/R1%2D1904022%2Ezip, [retrieved on Apr. 7, 2019], Section 2.2.3.

RAN1 Chairman's Notes, 3GPP TSG RAN WG1 Meeting #96bis, Xi'an, China, Apr. 8-12, 2019, p. 83.

"3rd Generation Partnership Project; Technical Specification Group Radio Access Network; NR; Physical Layer Procedures for Control (Release 15)", 3GPP Standard, Technical Specification, 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V15.8.0, (Dec. 2019), Jan. 11, 2020 (Jan. 11, 2020), pp. 1-109, XP051860646, Retrieved from the Internet: URL: http://ftp.3gpp.org/Specs/archive/38_series/38.213/38213-f80.zip 38213-f80.docx.

Dabbagh A.D., et al., "On UMTS-LTE Physical Uplink Shared and Control Channels", 2008 IEEE 68th Vehicular Technology Conference, 2008, pp. 1-5.

* cited by examiner

CONTROL CHANNEL RESOURCE GROUPING AND SPATIAL RELATION CONFIGURATION

CROSS-REFERENCE TO RELATED APPLICATION(S)

This application claims benefit of and priority to U.S. Provisional Application No. 62/842,375, filed May 2, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for control channel resource configuration.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved control channel resource grouping and spatial relation configuration.

Certain aspects provide a method for wireless communication by a user equipment (UE). The method generally includes receiving an indication of one or more groupings of one or more control channel resources within a configured bandwidth. Each grouping is associated with a spatial relation. The method generally includes applying a spatial relation for a control channel transmission using one or more control channel resources in a grouping of the one or more groupings. The grouping is associated with the spatial relation.

In some examples, the one or more control channel resources comprise physical uplink control channel (PUCCH) resources. In some examples, at least one of the one or more groupings comprises any subset of the PUCCH resources within the configured bandwidth. In some examples, the configured bandwidth comprises at least one bandwidth part (BWP).

In some examples, the indication is an explicit indication. In some examples, the indication of the one or more groupings is received via one or more bitmaps. In some examples, the one or more bitmaps indicate PUCCH identifiers (IDs) included in the one or more of the groupings. In some examples, the method includes receiving an indication of one or more updated spatial relations and receiving, for each updated spatial relation, one or more bitmaps or PUCCH IDs associated with at least one of the one or more groupings. In some examples, receiving the one or more bitmaps or PUCCH IDs includes receiving a plurality of bitmaps or PUCCH IDs associated with a plurality of groupings, of the one or more groupings, for at least one of the one or more updated spatial relations. In some examples, the indication of the one or more updated spatial relations, the one or more bitmaps, or both is received via a medium access control (MAC) control element (CE).

In some examples, the indication is an implicit indication. In some examples, the indication of the one or more groupings is received via radio resource control (RRC) signaling. In some examples, the RRC signaling indicates, for each PUCCH resource, an associated spatial relation. The PUCCH resources having a same indicated spatial relation indicates a grouping. In some examples, the method includes receiving an indication of one or more updated spatial relations and receiving, for each updated spatial relation, one or more previously indicated spatial relations or one or more PUCCH IDs associated with at least one grouping of the one or more of the groupings. In some examples, receiving the one or more previously indicated spatial relations or one or more PUCCH IDs includes receiving a plurality of previously indicated spatial relations or a plurality of PUCCH IDs associated with a plurality of groupings for at least one updated spatial relation indication. In some examples, the indication of the one or more updated spatial relations, the one or more previously indicated spatial relations or one or more PUCCH IDs, or both, is received via a MAC-CE.

Certain aspects provide a method for wireless communication by a base station (BS). The method generally includes sending an indication to a UE of one or more groupings of one or more control channel resources within a configured bandwidth. Each grouping is associated with a spatial relation. The method generally includes receiving a control channel transmission, from the UE, using one or more control channel resources in a grouping, of the one or more groupings. The control channel transmission is based on the spatial relation associated with the grouping.

Certain aspects provide an apparatus for wireless communication. The apparatus generally includes means for receiving an indication of one or more groupings of one or more control channel resources within a configured bandwidth. Each grouping is associated with a spatial relation. The apparatus generally includes means for applying a spatial relation for a control channel transmission using one or more control channel resources in a grouping of the one or more groupings. The grouping is associated with the spatial relation.

Certain aspects provide an apparatus for wireless communication. The apparatus generally includes means for sending an indication to another apparatus of one or more groupings of one or more control channel resources within a configured bandwidth. Each grouping is associated with a spatial relation. The apparatus generally includes means for receiving a control channel transmission, from the another apparatus, using one or more control channel resources in a grouping, of the one or more groupings. The control channel transmission is based on the spatial relation associated with the grouping.

Certain aspects provide an apparatus for wireless communication. The apparatus generally includes a memory and at least one processor coupled with the memory. The memory and at least one processor are generally configured to receive an indication of one or more groupings of one or more control channel resources within a configured bandwidth. Each grouping is associated with a spatial relation. The memory and at least one processor are generally configured to apply a spatial relation for a control channel transmission using one or more control channel resources in a grouping of the one or more groupings. The grouping is associated with the spatial relation.

Certain aspects provide an apparatus for wireless communication. The apparatus generally includes a memory and at least one processor coupled with the memory. The memory and at least one processor are generally configured to send an indication to another apparatus of one or more groupings of one or more control channel resources within a configured bandwidth. Each grouping is associated with a spatial relation. The memory and at least one processor are generally configured to receive a control channel transmission, from the another apparatus, using one or more control channel resources in a grouping, of the one or more groupings. The control channel transmission is based on the spatial relation associated with the grouping.

Certain aspects provide a computer readable medium storing computer executable code thereon. The computer readable medium generally includes code for receiving an indication of one or more groupings of one or more control channel resources within a configured bandwidth. Each grouping associated with a spatial relation. The computer readable medium generally includes code for applying a spatial relation for a control channel transmission using one or more control channel resources in a grouping of the one or more groupings. The grouping is associated with the spatial relation.

Certain aspects provide a computer readable medium storing computer executable code thereon. The computer readable medium generally includes code for sending an indication to a UE of one or more groupings of one or more control channel resources within a configured bandwidth. Each grouping is associated with a spatial relation. The computer readable medium generally includes code for receiving a control channel transmission, from the UE, using one or more control channel resources in a grouping, of the one or more groupings. The control channel transmission is based on the spatial relation associated with the grouping.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
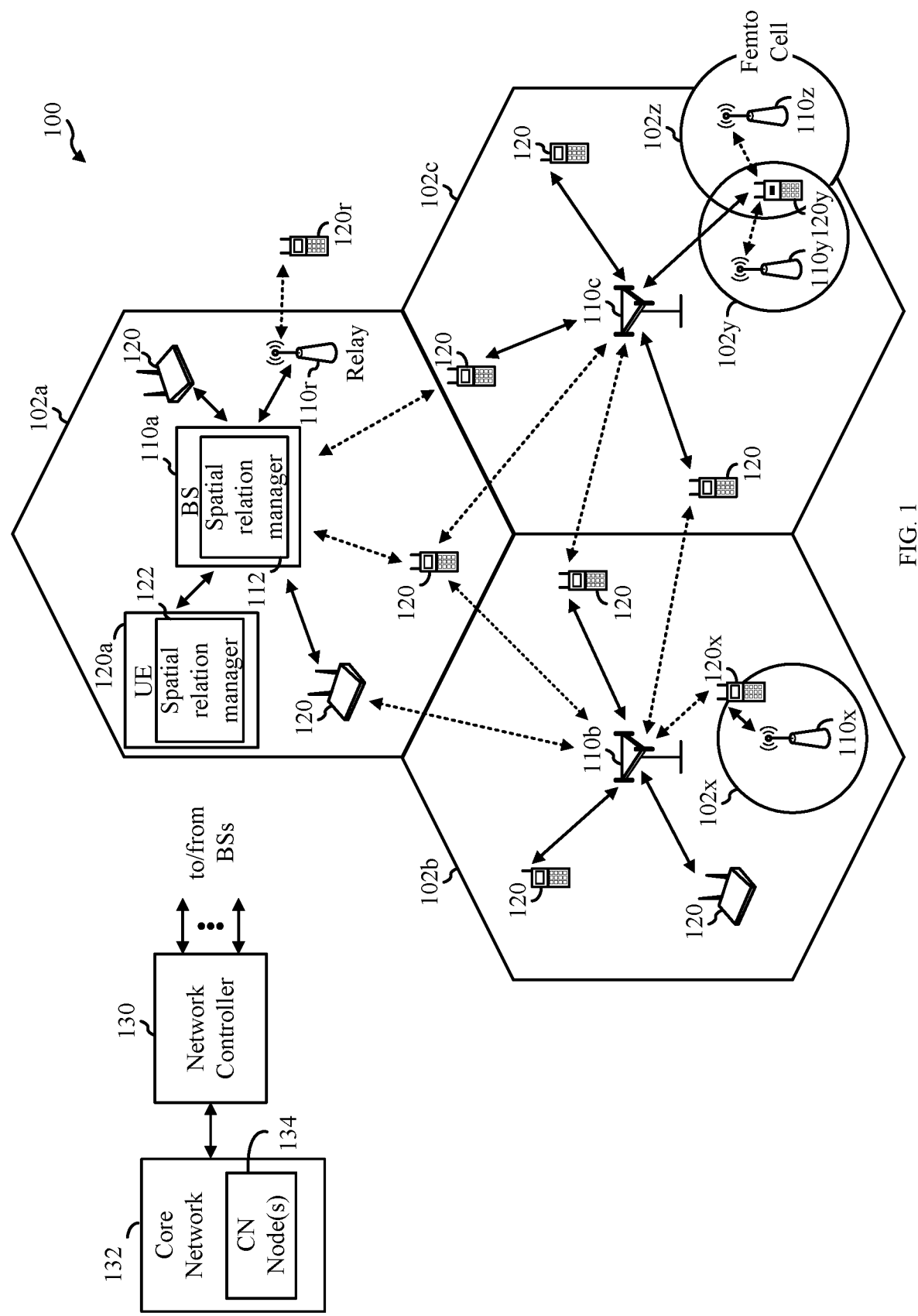
FIG. 1 is a block diagram conceptually illustrating an example telecommunications system, in accordance with certain aspects of the present disclosure.

Some systems, such as certain new radio systems (e.g., 5G NR systems), allow for one or more groupings of control channel resources in a configured frequency bandwidth, such as a frequency range. The control channel resources may refer to time and/or frequency resources configured for use for control channel transmission. For example, the groupings of control channel resources may be referred to as one or more physical uplink control channel (PUCCH) groupings (or groups) within at least one bandwidth part (BWP), such as a frequency range, configured at a user equipment (UE). For example, one or more control channel resources of a configured BWP may be included in a grouping. A BWP may refer to the bandwidth over which the UE is configured for communicating (e.g., using a certain numerology in a set of consecutive resource blocks (RBs)). The UE may be configured with multiple BWPs, which may be active or inactive at a given time. A grouping of control channel resources may be a group, set, subset, collection, combination, or pool of control channel resources.

The one or more groupings of control channel resources may be associated with a spatial relation (e.g., meaning the same spatial relation can be applied for all of the control channel resources in the grouping). In some examples, a spatial relation associated with a grouping indicates a relation between the control channel resources of the grouping and another signal, such as a channel state information reference signal (CSI-RS), synchronization signal block (SSB), and/or a sounding reference signal (SRS). The spatial relation may indicate to a UE to use a same spatial beam (e.g., transmit beam and/or the same set of weights when performing beamforming) to transmit the control channel resources of the grouping as used for receiving the corresponding related signal (e.g., the CSI-RS, SSB, SRS).

Aspects of the present disclosure provide apparatus, methods, processing systems, and computer readable mediums for the control channel resource grouping and spatial relation configuration, including spatial relation updates for control channel resource groupings.

In certain aspects, a grouping of control channel resources (e.g., such as one or more PUCCHs) can be configured (e.g., signaled, indicated, and/or updated) at a UE together (e.g., simultaneously, or in at least partially overlapping time resources) with configuration and/or an update of the spatial relation for the grouping. By configuring and/or updating the spatial relation for groupings together, the overhead for configuring the spatial relations for the groupings may be reduced. For example, rather than updating the spatial relation for each PUCCH individually, such as using separate medium access control control elements (MAC-CEs), a base station (BS) can send a single MAC-CE to update the spatial relation for a group, or groups, of PUCCHs.

In some examples, one grouping may include all PUCCH within a BWP and/or multiple BWPs. However, finer, more flexible, grouping involving any combination of the control channel resources may be used, as well as techniques for signaling (e.g., indicating and/or updating) the groupings and the associated spatial relations. In some examples, one grouping may include a subset of PUCCH within a BWP.

In some examples, the groupings may be explicitly indicated to the UE, such as by a bitmap indicating the control channel resources in a group. For example, bits in the bitmap may indicate the control channel resources in a grouping, and a spatial relation can be signaled with the bitmap indicating the spatial relation associated with the grouping. In some examples, the groupings of control channel resources may be implicitly indicated, such as by the configuration (e.g., via higher layer signaling such as radio resource control (RRC) signaling) of the spatial relations or PUCCH IDs for the control channel resources. For example, control channel resources configured with the same spatial relation or PUCCH ID may be considered (e.g., assumed/determined) as a grouping.

The following description provides examples of control channel resource grouping and spatial relation configuration, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

FIG. 1 illustrates an example wireless communication network 100 in which aspects of the present disclosure may be performed. In some examples, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. Each BS 110 may provide communication coverage for a particular geographic area, sometimes referred to as a "cell", which may be stationary or may move according to the location of a mobile BS 110. In some examples, the BSs 110 may be interconnected to one another and/or to one or more other network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS 110 may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

As shown in FIG. 1, the UE 120*a* includes a spatial relation manager 122. The spatial relation manager 122 may be configured to receive an indication of one or more groupings of one or more control channel resources within a configured bandwidth, each grouping being associated with a spatial relation, in accordance with certain aspects of the present disclosure. The spatial relation manager 122 may be configured to apply a spatial relation for a control channel transmission using control channel resources in a grouping, of the one or more indicated groupings. The grouping is associated with the spatial relation. As shown in FIG. 1, the BS 110*a* includes a spatial relation manager 112. The spatial relation manager 112 may be configured to send an indication to UE 120*a* of one or more groupings of one or more control channel resources within a configured bandwidth, each grouping being associated with a spatial relation, in accordance with certain aspects of the present disclosure. The spatial relation manager 112 may be configured to receive a control channel transmission, from the UE 120*a*, using control channel resources in a grouping of the one or more indicated groupings. The control channel transmission is based on spatial relation associated with the grouping.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul.

Figure 2:
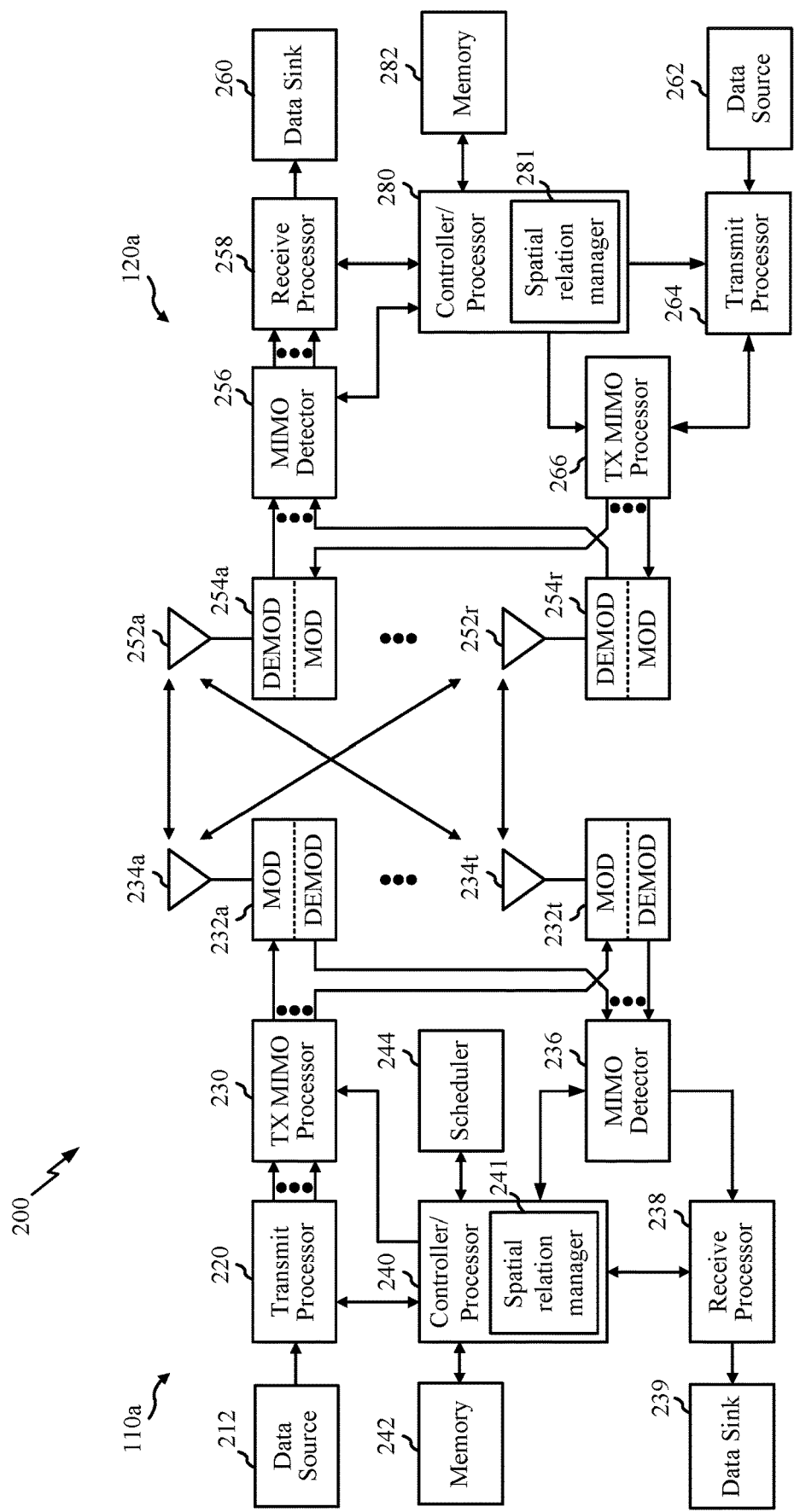
FIG. 2 is a block diagram conceptually illustrating a design of an example base station (BS) and user equipment (UE), in accordance with certain aspects of the present disclosure.

FIG. 2 illustrates example components of a BS and a UE, such as the BS 110*a* and the UE 120*a* in the wireless communication network 100 of FIG. 1, which may be used to implement aspects of the present disclosure. For example, antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the PUCCH) from the controller/processor 280. The transmit processor 264 may also generate reference symbols for a reference signal (e.g., for the SRS). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The controllers/processors 240 and 280 may direct the operation at the BS 110*a* and the UE 120*a*, respectively. The memories 242 and 282 may store data and program codes for BS 110*a* and UE 120*a*, respectively. A scheduler 244 may schedule UEs for data transmission on the downlink and/or uplink. As shown in FIG. 2, the controller/processor 280 of the UE 120*a* has a spatial relation manager 281 that may be configured for receiving an indication of one or more groupings of one or more control channel resources within a configured bandwidth, each grouping being associated with a spatial relation. The spatial relation manager 281 may be configured to apply a spatial relation for a control channel transmission using control channel resources in a grouping, of the one or more indicated groupings. The spatial relation is associated with the grouping, according to aspects described herein. As shown in FIG. 2, the controller/processor 240 of the BS 110*a* has a spatial relation manager 241 that may be configured for sending an indication to the UE 120*a* of one or more groupings of one or more control channel resources within a configured bandwidth, each grouping being associated with a spatial relation. The spatial relation manager 241 may be configured to receive a control channel transmission, from the UE 120*a*, using control channel resources in a grouping of the one or more indicated groupings. The control channel transmission is based on a spatial relation associated with the grouping, according to aspects described herein.

Figure 3A:
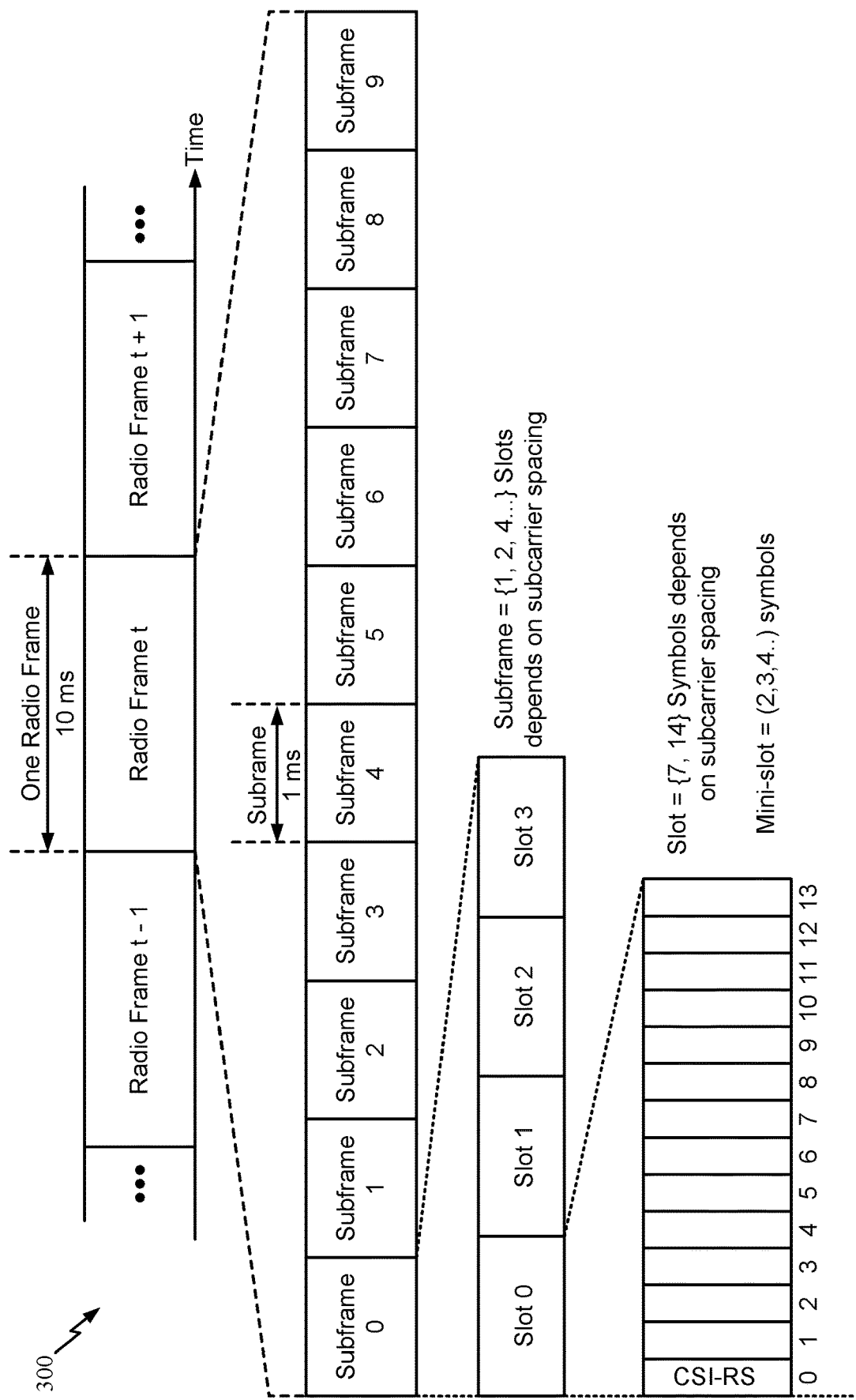
FIG. 3A is an example new radio frame format, in accordance with certain aspects of the present disclosure.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the subcarrier spacing (SCS). Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As mentioned above, aspects of the present disclosure relate to control channel grouping and spatial relation configuration. In certain systems (e.g., NR systems), beam forming may be applied to certain transmissions. For uplink beamforming transmission, a UE (e.g., such as the UE 120a in the wireless communication network 100) may be configured with a spatial relation. The spatial relation may be used to determine the uplink transmit (TX) beam for the UE to use for transmitting. In some examples, the spatial relation indicates a relation between the uplink transmission and another signal, such as a downlink reference signal. The spatial relation may tell the UE to use the uplink beam to transmit the uplink transmission that corresponds to the receive beam used to receive the corresponding related downlink signal at the UE. In some cases, the UE may be configured with a set of the spatial relations, and another signal, such as medium access control (MAC) control element (CE), can be used to activate one of the configured spatial relations.

Example Control Channel Resource Grouping and Spatial Relation Configuration

Aspects of the present disclosure provide apparatus, methods, processing systems, and computer readable mediums for control channel resource grouping and spatial relation configuration, including spatial relation updates for control channel resource groupings.

In some cases, control channel resources, such as physical uplink control channels (PUCCHs), that use a same spatial relation may be included in a grouping and can be signaled together (e.g., simultaneously) to configure and/or update the spatial relation associated with the grouping. This may reduce overhead for configuring the spatial relations for PUCCHs. For example, rather than updating the spatial relation for each PUCCH individually, such as using separate medium access control control elements (MAC-CEs), a base station (BS) can send a single MAC-CE to update the spatial relation for a group, or groups, of PUCCHs.

Aspects of the disclosure provide techniques that may allow for flexibly configuring groupings, as well as techniques for configuring and updating the associated spatial relations.

The control channel resource groupings can include groupings of any of the control channel resources in at least the configured bandwidth. In some examples, a bandwidth part (BWP) may include multiple groupings, where the groupings include a subset of the control channel resources in the BWP. In some examples, a grouping may include all of the control channel resources in one BWP. In some examples, a grouping may include control channel resources from multiple BWPs. In some examples, the groupings may be indicated explicitly to a user equipment (UE). In some examples, the groupings of control channel resources may be implicitly indicated to the UE.

In an illustrative example, as shown in FIG. 3A, a subframe may include a channel state information reference signal (CSI-RS) transmission transmitted from a BS to a UE. The UE may measure the CSI-RS and send a CSI report in PUCCH. The UE may determine the beam used for the PUCCH transmission based on the grouping to which the PUCCH belongs, and the spatial relation associated with the grouping.

Figure 3B:
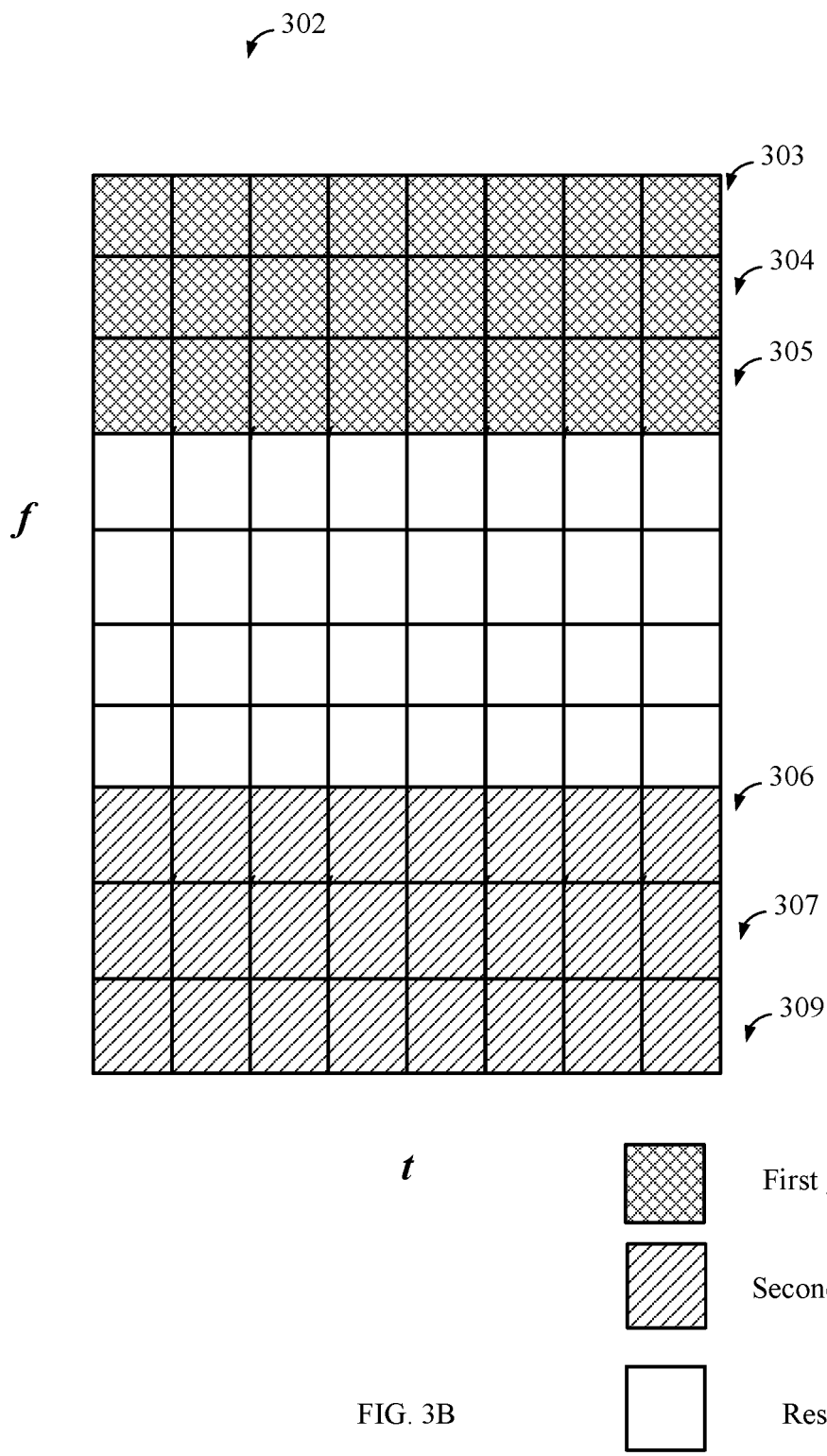
FIG. 3B is an example grouping of control channel resources in a configured bandwidth, in accordance with certain aspects of the present disclosure.
Figure 3C:
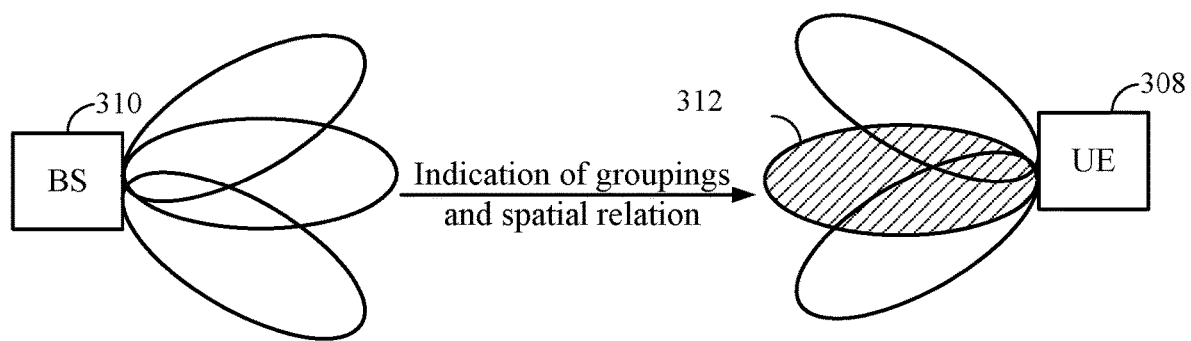
FIG. 3C is an example indication of control channel resource grouping(s) and spatial relation, in accordance with certain aspects of the present disclosure.

As shown in FIG. 3B, the UE may be configured with a bandwidth, such as bandwidth part (BWP) 302 that includes control channel resources, such as PUCCHs 303, 304, 305, 306, 307, and 309. The BS 310 may configure/signal the UE 308 with a grouping of the control channel resources as shown in FIG. 3C. For example, as shown in FIG. 3B, the BS 310 may configure/signal the PUCCHs 303, 304, and 305 as a first grouping and PUCCHs 306, 307, and 309 as a second grouping. As shown in FIG. 3C, the BS 310 also configures/signals a spatial relation associated with the groupings. For example, the first grouping of PUCCHs 303, 304, and 305 may have a first spatial relation associated with a DL CSI-RS and the second grouping of PUCCHs 306, 307, and 309 may have a second spatial relation associated with a DL CSI-RS. Based on the control channel resources used for PUCCH transmission, the UE 308 and BS 310 can determine the associated spatial relation to use for the PUCCH transmission.

Figure 3D:
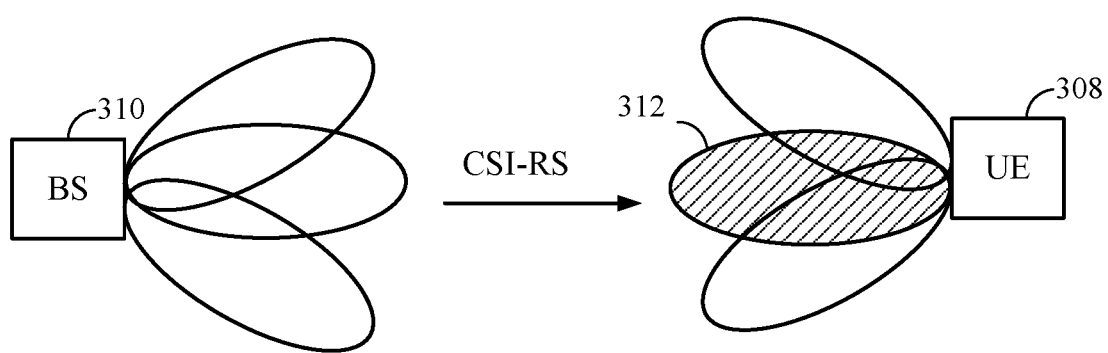
FIG. 3D is an example channel state information (CSI-RS) reference signal reception with a UE receive beam, in accordance with certain aspects of the present disclosure.
Figure 3E:
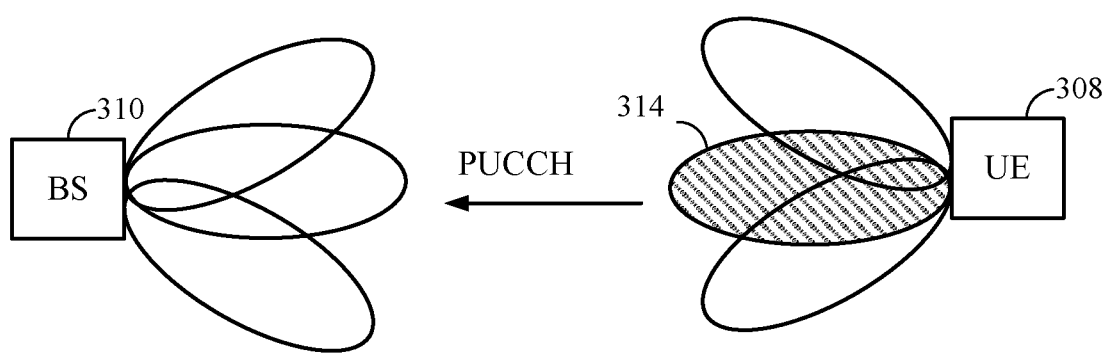
FIG. 3E is an example physical uplink control channel (PUCCH) transmission with a UE transmit beam according to a spatial relation associated with the control channel resource grouping, in accordance with certain aspects of the present disclosure.

Based on the spatial relation applied, the UE 308 can determine the transmit beam to use for sending the PUCCH, and the BS 310 can determine the receive beam to use for receiving the PUCCH. For example, as shown in FIG. 3D, the UE 308 may receive a CSI-RS from the BS 310 via the receive beam 312. Thus, as shown in FIG. 3E, the UE 308 sends the PUCCH transmission using the transmit 314 according to the spatial relation associated with the reception of the CSI-RS with the receive beam 312.

Figure 4:
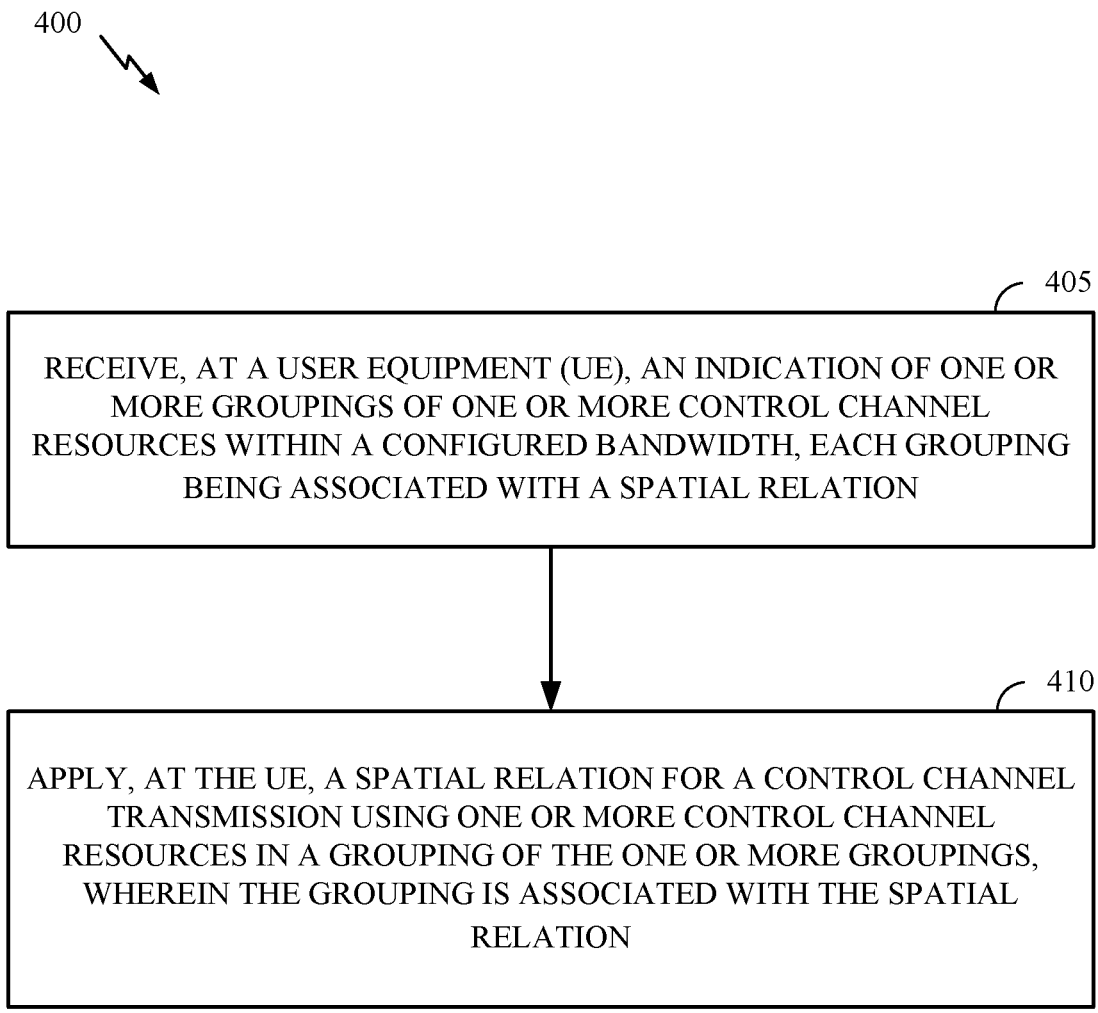
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE such as a UE 120a in the wireless communication network 100. Operations 400 may be implemented as software components that are executed and run on one or more processors (e.g., controller/processor 280 of FIG. 2). Further, the transmission and reception of signals by the UE 120a in operations 400 may be enabled, for example, by one or more antennas (e.g., antennas 252 of FIG. 2). In certain aspects, the transmission and/or reception of signals by the UE 120a may be implemented via a bus interface of one or more processors (e.g., controller/processor 280) obtaining and/or outputting signals.

The operations 400 may begin, at 405, by receiving an indication of one or more groupings of one or more control channel resources within a configured bandwidth. Each grouping is associated with a spatial relation. In some examples, the one or more control channel resources include PUCCH resources. For example, the one or more groupings may correspond to one or more groupings of PUCCHs.

According to certain aspects, a grouping can be any set of control channel resources within at least one configured bandwidth (e.g., a configured portion of available system bandwidth). In some examples, at least one of the one or more groupings, indicated at 405, includes a subset of the PUCCHs within the configured bandwidth. The configured bandwidth may include at least one BWP. In some examples, one or more of the groupings may correspond to all of the PUCCHs in one BWP. In some examples, one or more of the groupings may correspond to PUCCHs from multiple BWPs.

According to certain aspects, the groupings may be indicated explicitly. For example, a bitmap may be used to indicate selected control channel resources as included in a grouping. The indication of the one or more groupings, received at 405, may be received via a bitmap or via multiple bitmaps (e.g., such as one bitmap per grouping). The bitmap may indicate PUCCH identifiers (IDs) of PUCCHs included in at least one of the one or more of the groupings.

In some examples, the UE 120a may receive an indication of one or more updated spatial relations and receive, for each updated spatial relation, one or more bitmaps or PUCCH IDs associated with at least one of the one of the one or more groupings. For example, to update multiple groupings (e.g., simultaneously) with the updated spatial relation, the UE 120a receives the indication of the new (e.g., updated) spatial relation along with a plurality of bitmaps or PUCCH IDs associated with a plurality of groupings, of the one or more groupings, for at least one of the one or more updated spatial relations. Accordingly, the UE 120a updates the spatial relation for each of the plurality of groupings to be the new spatial relation. In some examples, the indication of the one or more updated spatial relations, the one or more bitmaps or PUCCH IDs, or both is received via a MAC-CE (e.g., a single MAC-CE).

According to certain aspects, the groupings may be indicated implicitly. For example, a grouping may be defined as control channel resources configured with a same spatial relation. In some examples, the indication of the one or more groupings, received at 405, is received via radio resource control (RRC) signaling. For example, the RRC signaling may indicate (e.g., configure), for each PUCCH, an associated spatial relation or group ID. The PUCCHs that are configured with the same spatial relation or group ID may be considered as a grouping.

In some examples, the UE 120a may receive an indication of one or more updated (e.g., new) spatial relations and receive, for each updated spatial relation, one or more previously indicated (e.g., old) spatial relations or one or more PUCCH IDs associated with at least one grouping of the one or more of the groupings. Thus, based on the grouping(s) associated with the indicated old spatial relation(s), the UE 120a may know (e.g., determine) that those grouping(s) are to be updated with the indicated new spatial relation. In the case of PUCCH IDs, based on the grouping(s) associated with the indicated PUCCH ID(s), the UE 120a may know (e.g., determine) that the grouping(s) are to be updated with the indicated new spatial relation. In some examples, to update multiple groupings (e.g., simultaneously) with the updated spatial relation, the UE 120a may receive a plurality of previously indicated spatial relations or a plurality of PUCCH IDs associated with a plurality of groupings for at least one updated spatial relation indication. In some examples, the indication of the one or more updated spatial relations, the one or more previously indicated spatial relations or one or more PUCCH IDs, or both, is received via a MAC-CE (e.g., a single MAC-CE). In some examples, the MAC-CE includes the one or more bitmaps. In some examples, the MAC-CE includes an indication of one or more preconfigured bitmaps (e.g., the MAC-CE may indicate an index of a preconfigured bitmap).

At 410, the UE 120a applies a spatial relation for a control channel transmission using control channel resources in a grouping of the one or more groupings. The grouping is associated with the spatial relation. For example, the UE 120a may use an uplink TX beam for the control channel (e.g., PUCCH) transmission that is determined based on the spatial relation that is associated with grouping to which the control channel resource(s) used for the control channel transmission belongs.

Figure 5:
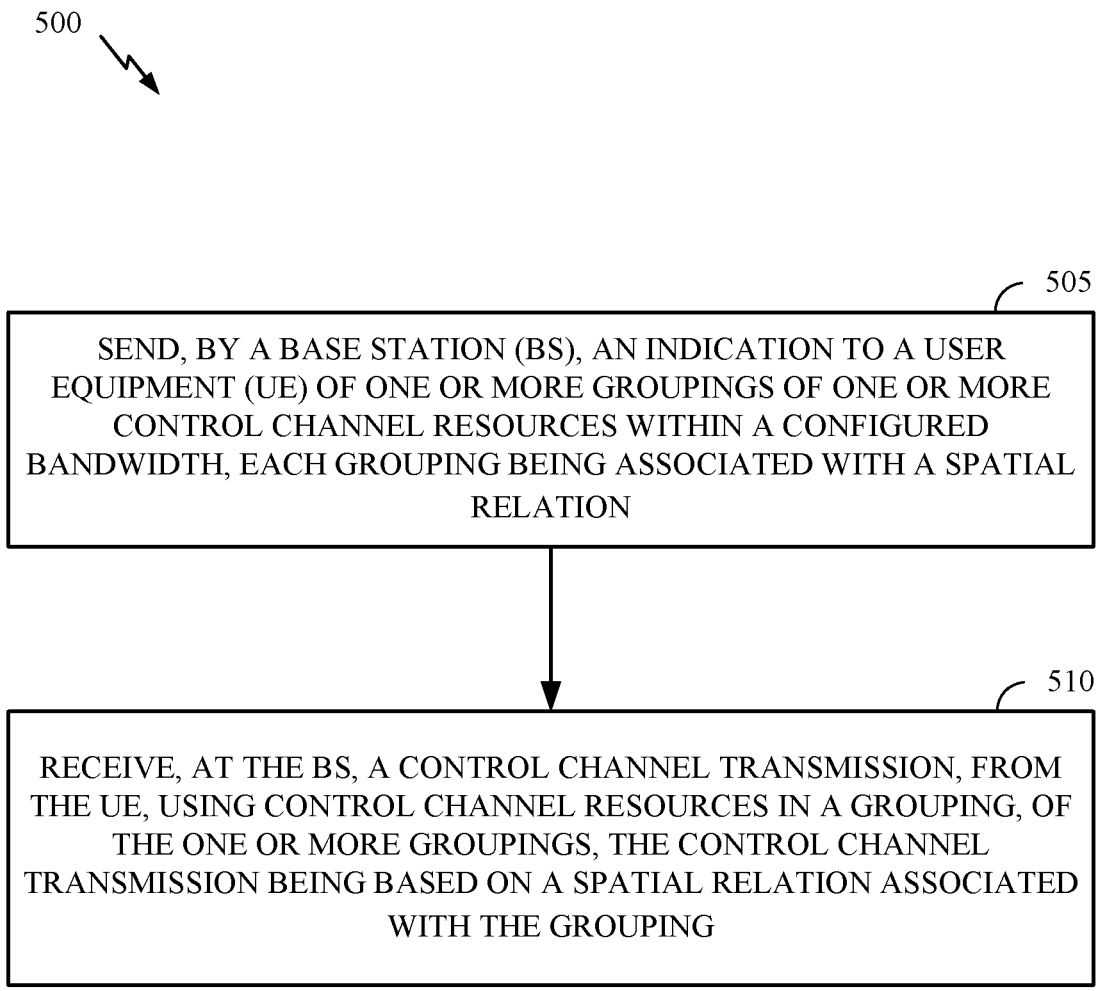
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a BS such as a BS 110a in the wireless communication network 100. The operations 500 may be complimentary operations by the BS 110a to the operations 400 performed by the UE 120a. Operations 500 may be implemented as software components that are executed and run on one or more processors (e.g., controller/processor 240 of FIG. 2). Further, the transmission and reception of signals by the BS 110a in operations 500 may be enabled, for example, by one or more antennas (e.g., antennas 234 of FIG. 2). In certain aspects, the transmission and/or reception of signals by the BS 110a may be implemented via a bus interface of one or more processors (e.g., controller/processor 240) obtaining and/or outputting signals.

The operations 500 may begin, at 505, by sending an indication to a UE (e.g., such as the UE 120a) of one or more groupings of one or more control channel resources within a configured bandwidth. Each grouping is associated with a spatial relation. A grouping of control channel resources may be a group, set, subset, collection, combination, or pool of control channel resources.

As discussed herein, a grouping, indicated at 505, may include any set or subset of control channel resources (e.g., PUCCHs) within at least one configured bandwidth (e.g., a BWP). The one or more groupings, indicated at 505, may be indicated explicitly (e.g., via a bitmap) or implicitly (e.g., via configured spatial relations or PUCCH IDs). Spatial relations for the groupings may be indicated/updated (e.g., via MAC-CE), by indicating the updated spatial relation along with an indication of the groupings to be updated with the new spatial relation, such as by indicating the bitmaps, PUCCH IDs, or old spatial relations associated with groupings to be updated.

At 510, the BS 110a receives a control channel transmission, from the UE (e.g., UE 120a), using control channel resources in a grouping of the one or more groupings. The control channel transmission is based on a spatial relation associated with the grouping. For example, the control channel transmission may be scheduled by the BS 110a on the one or more control channel resources. Based on the scheduled control channel resources, the BS 110a may know (e.g., determine) the UE 120a will apply the spatial relation associated with the grouping to which the scheduled control channel resource(s) belong, for the control channel transmission. Thus, the BS 110a may monitor for the control channel transmission using a RX beam associated with the uplink TX beam associated with that spatial relation. In some examples, the BS 110a may select a RX beam to use for the control channel transmission based on the uplink TX used by the UE 120a.

Figure 6:
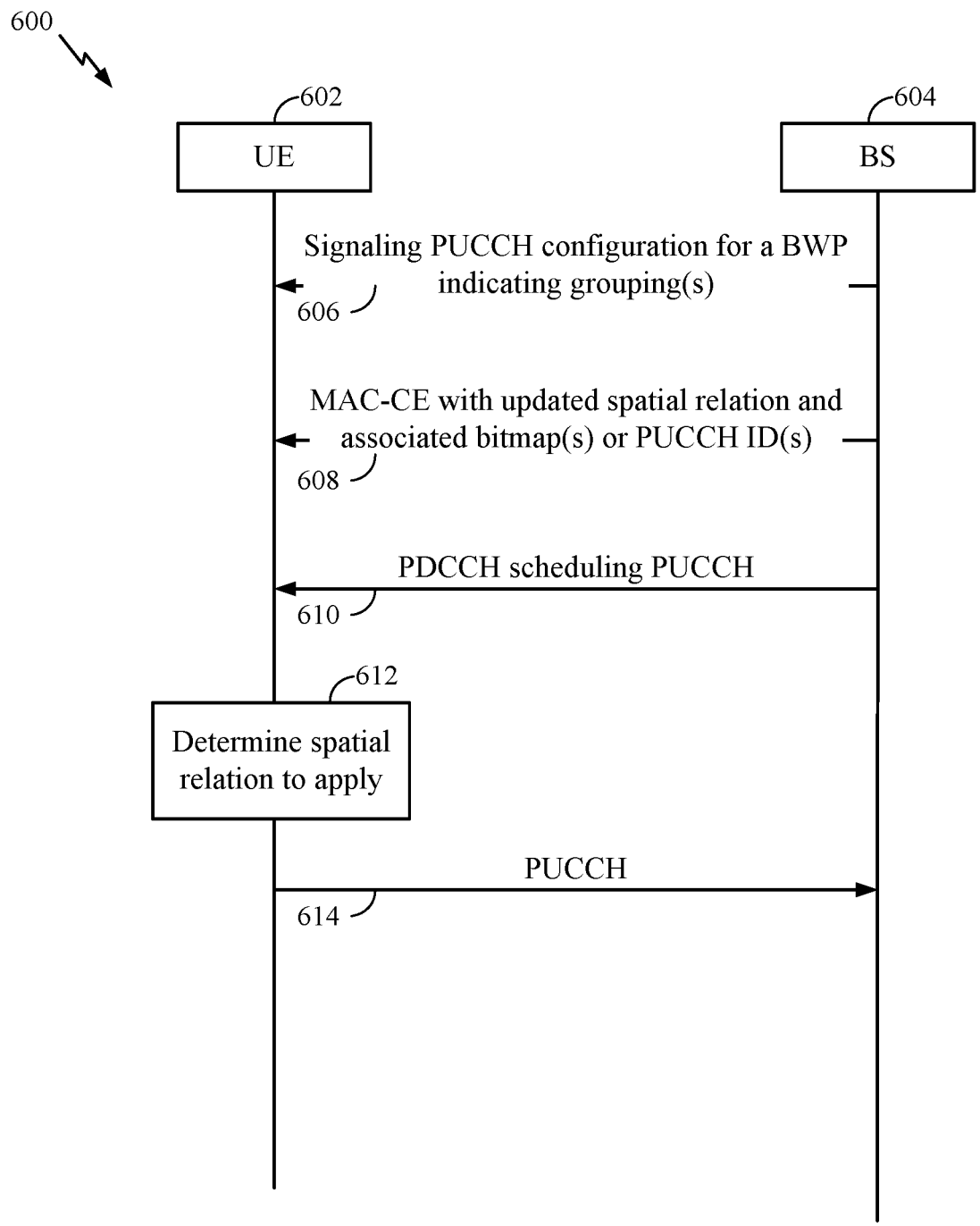
FIG. 6 is a call flow diagram illustrating example control channel resource grouping and spatial relation configuration, in accordance with certain aspects of the present disclosure.

FIG. 6 is a call flow 600 diagram illustrating example control channel resource grouping and spatial relation configuration, in accordance with certain aspects of the present disclosure. As shown in FIG. 6, at 606, a UE 602 (e.g., such as the UE 120a) may receive a PUCCH configuration for a BWP from a BS 604 (e.g., such as the BS 110a). In some examples, the PUCCH configuration may be received by RRC signaling and/or downlink control information (DCI). At 608, the UE 602 may receive a MAC-CE with an updated spatial relation and one or more bitmaps. For example, the MAC-CE, received at 608, may include the bitmaps or PUCCH IDs associated with the PUCCH groupings to be updated with the updated spatial relation. At 610, the UE 602 may receive a physical downlink control channel (PDCCH) scheduling a PUCCH transmission. At 612, the UE 602 may determine the spatial relation to apply for the PUCCH transmission. For example, the PDCCH may schedule the resources to be used for the PUCCH transmission. Based on the grouping to which the scheduled resources belong, the UE 602 can determine the spatial relation associated with that grouping. Thus, at 614, the UE 602 sends the PUCCH according to the determined spatial relation. For example, the UE 602 may use an uplink TX beam based on the determined spatial relation (e.g., using a beam corresponding to a beam used for a related transmission indicated by the spatial relation).

Figure 7:
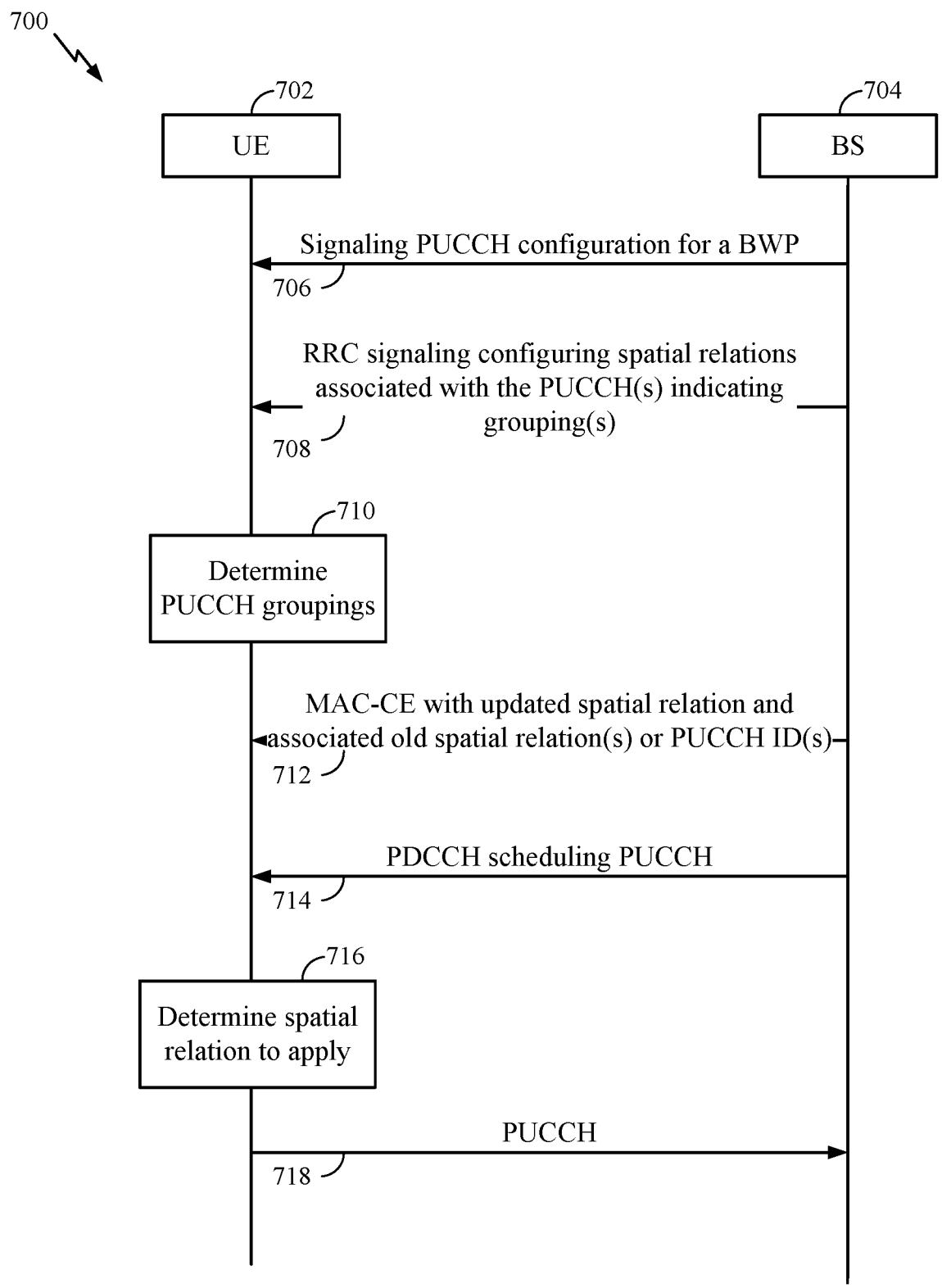
FIG. 7 is a call flow diagram illustrating another example control channel resource grouping and spatial relation configuration, in accordance with certain aspects of the present disclosure.

FIG. 7 is a call flow 700 diagram illustrating another example control channel resource grouping and spatial relation configuration, in accordance with certain aspects of the present disclosure.

As shown in FIG. 7, at 706, a UE 702 (e.g., such as the UE 120a) may receive a PUCCH configuration for a BWP from a BS 704 (e.g., such as the BS 110a). In some examples, the PUCCH configuration may be received by RRC signaling and/or DCI. At 708, the UE 702 may receive RRC signaling configuring spatial relations associated with the configured PUCCH(s). At 710, the UE 702 may determine PUCCH groupings. For example, based on the spatial relations configured for the PUCCH(s), the UE 702 can determine PUCCHs configured with a same spatial relation to be in a grouping. At 712, the UE 702 may receive a MAC-CE with an updated spatial relation and associated old spatial relation(s) or PUCCH ID(s). For example, the MAC-CE, received at 712, may include the old spatial relations (e.g., configured at 708) or PUCCH IDs (which may be configured at 706) associated with the PUCCH groupings to be updated with the updated spatial relation. At 714, the UE 702 may receive a PDCCH scheduling a PUCCH transmission. At 716, the UE 702 may determine the spatial relation to apply for the PUCCH transmission. For example, the PDCCH may schedule the resources to be used for the PUCCH transmission. Based on the grouping to which the scheduled resources belong, the UE 702 can determine the spatial relation associated with that grouping. Thus, at 718, the UE 702 sends the PUCCH according to the determined spatial relation. For example, the UE 702 may use an uplink TX beam based on the determined spatial relation (e.g., using a beam corresponding to a beam used for a related transmission indicated by the spatial relation).

Figure 8:
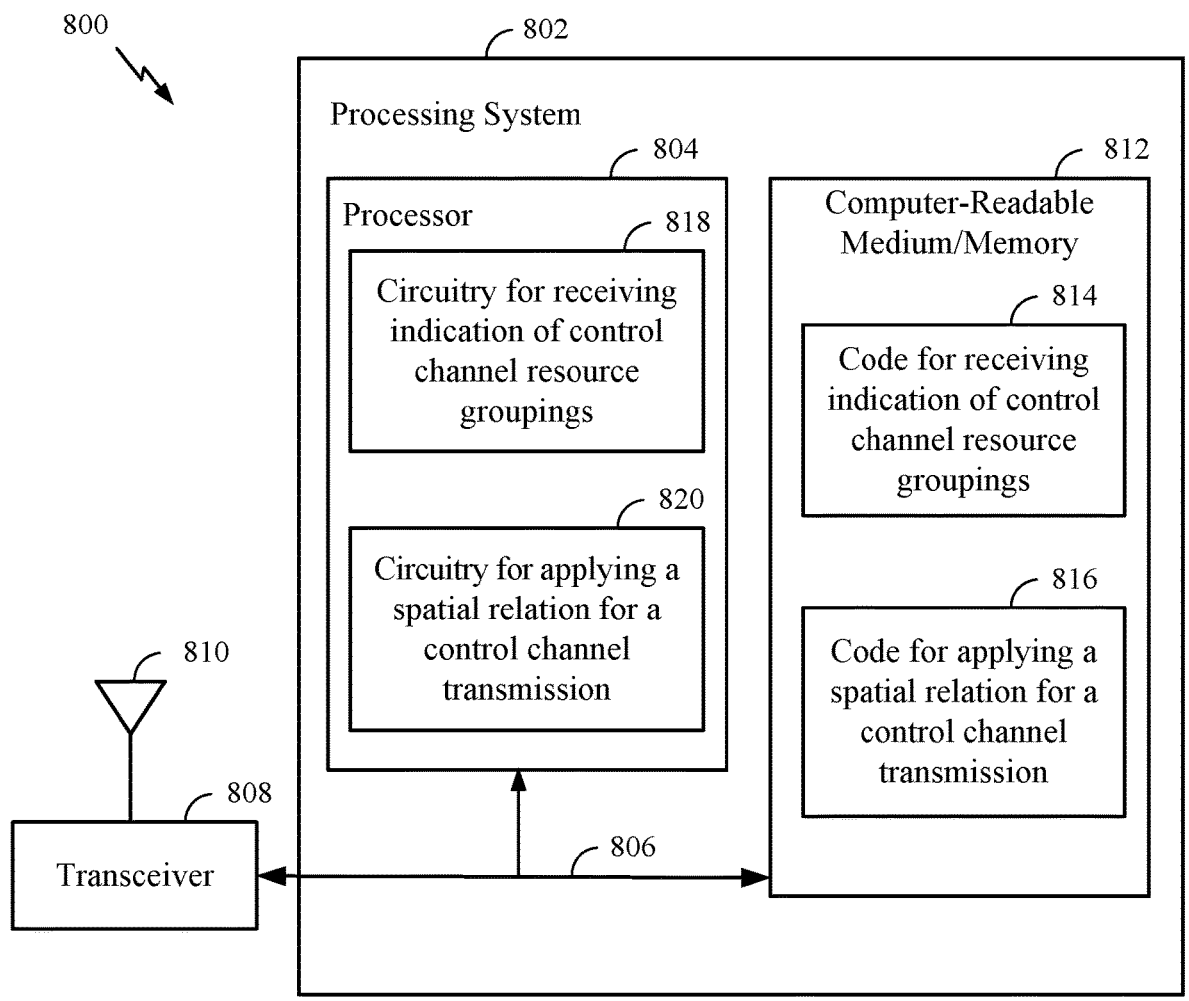
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein for control channel resource grouping and spatial relation configuration, such as the operations illustrated in FIG. 4. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for control channel resource grouping and spatial relation configuration. In certain aspects, computer-readable medium/memory 812 stores code 814 for receiving an indication of one or more groupings of one or more control channel resources within a configured bandwidth, each grouping being associated with a spatial relation, in accordance with aspects of the present disclosure; and code 816 for applying a spatial relation for a control channel transmission as indicated in the indication, in accordance with aspects of the present disclosure. In certain aspects, the processor 804 has circuitry configured to implement the code stored in the computer-readable medium/memory 812. The processor 804 includes circuitry 818 for receiving an indication of one or more groupings of one or more control channel resources within a configured bandwidth, each grouping being associated with a spatial relation; and circuitry 820 for applying a spatial relation for a control channel as indicated in the indication, in accordance with aspects of the present disclosure.

Figure 9:
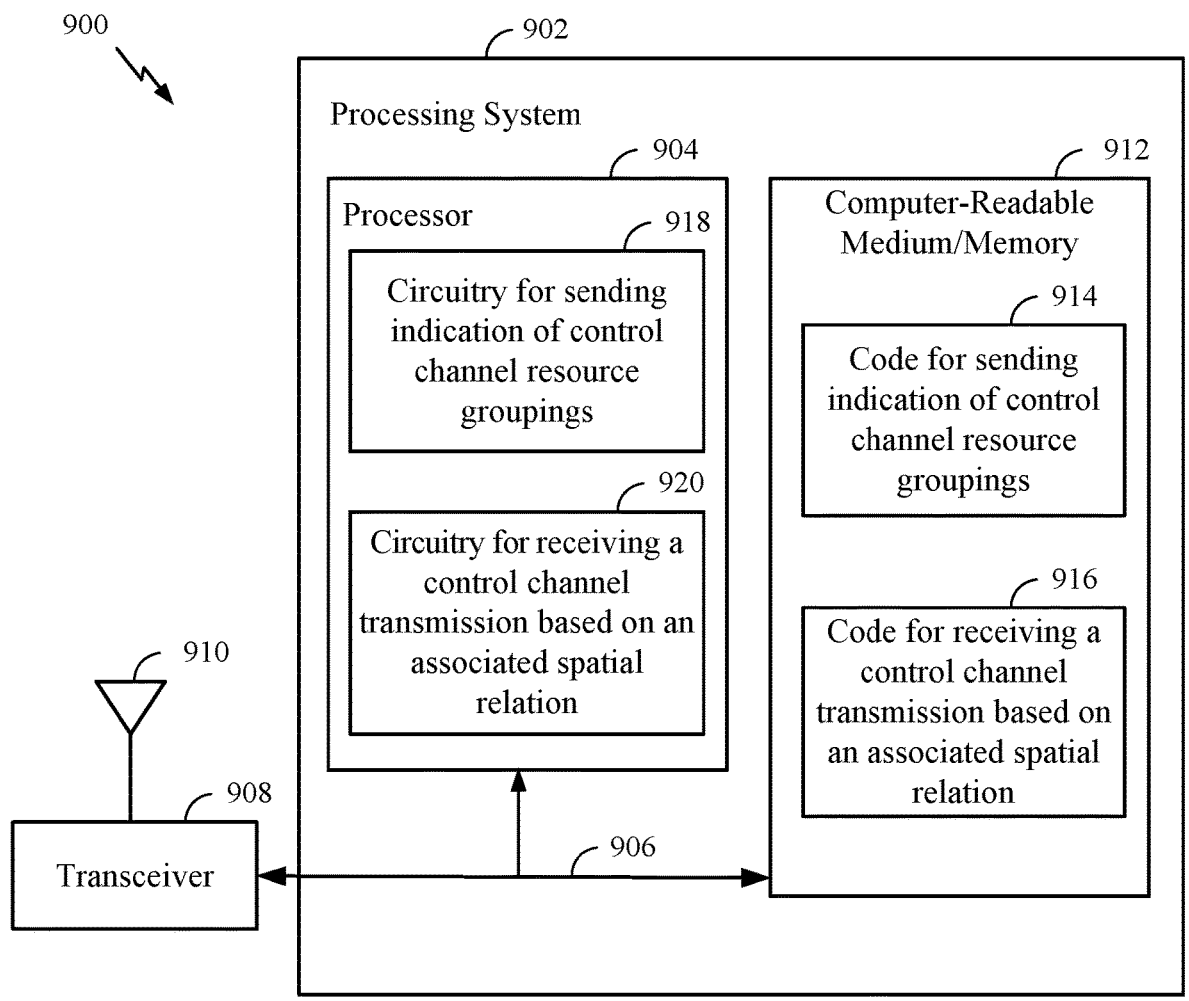
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein for control channel resource grouping and spatial relation configuration, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein for control channel resource grouping and spatial relation configuration. In certain aspects, computer-readable medium/memory 912 stores code 914 for sending an indication to a UE of one or more groupings of one or more control channel resources within a configured bandwidth, each grouping being associated with a spatial relation, in accordance with aspects of the present disclosure; and code 916 for receiving a control channel transmission from the UE based on a spatial relation associated with the control channel, in accordance with aspects of the present disclosure. In certain aspects, the processor 904 has circuitry configured to implement the code stored in the computer-readable medium/memory 912.

The processor 904 includes circuitry 918 for sending an indication to a UE of one or more groupings of one or more control channel resources within a configured bandwidth, each grouping being associated with a spatial relation; and circuitry 920 for receiving a control channel transmission from the UE based on a spatial relation associated with the control channel, in accordance with aspects of the present disclosure.

Example Aspects

In a first aspect, a method for wireless communication by a user equipment (UE) includes receiving an indication of one or more groupings of one or more control channel resources within a configured bandwidth. Each grouping is associated with a spatial relation. The UE applies a spatial relation for a control channel transmission using one or more control channel resources in a grouping of the one or more groupings. The grouping is associated with the spatial relation.

In a second aspect, in combination with the first aspect, the one or more control channel resources are physical uplink control channel (PUCCH) resources.

In a third aspect, in combination with one or more of the first and second aspects, at least one of the one or more groupings includes a subset of one or more control channel resources within the configured bandwidth.

In a fourth aspect, in combination with one or more of the first through third aspects, the configured bandwidth is a bandwidth part (BWP).

In a fifth aspect, in combination with one or more of the first through fourth aspects, receiving the indication of the one or more groupings includes receiving an explicit indication of the one or more groupings.

In a sixth aspect, in combination with one or more of the first through fifth aspects, the indication of the one or more groupings is received via one or more bitmaps.

In a seventh aspect, in combination with one or more of the first through sixth aspects, the one or more bitmaps indicate physical uplink control channel (PUCCH) identifiers (IDs) of the control channel resources included in the one or more groupings.

In an eighth aspect, in combination with one or more of the first through seventh aspects, the UE receives an indication of one or more updated spatial relations and the UE receives, for each updated spatial relation, one or more bitmaps or PUCCH identifiers (IDs) associated with at least one of the one of the one or more groupings.

In a ninth aspect, in combination with one or more of the first through eighth aspects, receiving the one or more bitmaps or PUCCH IDs includes receiving a plurality of bitmaps or PUCCH IDs associated with a plurality of groupings, of the one or more groupings, for at least one of the one or more updated spatial relations.

In a tenth aspect, in combination with one or more of the first through ninth aspects, the indication of the one or more updated spatial relations, the one or more bitmaps or PUCCH IDs, or both is received via a medium access control (MAC) control element (CE).

In an eleventh aspect, in combination with one or more of the first through tenth aspects, the indication of the one or more groupings is an implicit indication.

In a twelfth aspect, in combination with one or more of the first through eleventh aspects, the indication of the one or more groupings is received via radio resource control (RRC) signaling.

In a thirteenth aspect, in combination with one or more of the first through twelfth aspects, the RRC signaling indicates, for each PUCCH resource, an associated spatial relation. The PUCCH resources having a same indicated spatial relation implicitly indicates a grouping.

In a fourteenth aspect, in combination with one or more of the first through thirteenth aspects, the RRC signaling indicates, for each PUCCH resource, an associated group identifier (ID). The PUCCH resources having a same indicated group ID implicitly indicates a grouping.

In a fifteenth aspect, in combination with one or more of the first through fourteenth aspects, the UE receives an indication of one or more updated spatial relations and the UE receives, for each updated spatial relation, one or more previously indicated spatial relations or one or more physical uplink control channel (PUCCH) identifiers (IDs) associated with at least one grouping of the one or more of the groupings.

In a sixteenth aspect, in combination with one or more of the first through fifteenth aspects, receiving the one or more previously indicated spatial relations or one or more PUCCH IDs includes receiving a plurality of previously indicated spatial relations or a plurality of PUCCH IDs associated with a plurality of groupings for at least one updated spatial relation indication.

In a seventeenth aspect, in combination with one or more of the first through sixteenth aspects, the indication of the one or more updated spatial relations, the one or more previously indicated spatial relations or one or more PUCCH IDs, or both, is received via a medium access control (MAC) control element (CE).

In an eighteenth aspect, a method for wireless communication by a base station (BS) includes sending an indication to a user equipment (UE) of one or more groupings of one or more control channel resources within a configured bandwidth. Each grouping is associated with a spatial relation. The BS receives a control channel transmission, from the UE, using one or more control channel resources in a grouping, of the one or more groupings. The control channel transmission is based on the spatial relation associated with the grouping.

In a nineteenth aspect, in combination with the eighteenth aspect, at least one of the one or more groupings comprises a subset of one or more control channel resources within the configured bandwidth.

In a twentieth aspect, in combination with one or more of the eighteenth and nineteenth aspects, the configured bandwidth includes at least one bandwidth part (BWP).

In a twenty-first aspect, in combination with one or more of the eighteenth through twentieth aspects, sending the indication of the one or more groupings includes sending an explicit indication of the one or more groupings.

In a twenty-second aspect, in combination with one or more of the eighteenth through twenty-first aspects, the indication of the one or more groupings is sent via one or more bitmaps.

In a twenty-third aspect, in combination with one or more of the eighteenth through twenty-second aspects, the one or more bitmaps indicate physical uplink control channel (PUCCH) identifiers (IDs) included in the one or more of the groupings.

In a twenty-fourth aspect, in combination with one or more of the eighteenth through twenty-third aspects, the indication of the one or more groupings is an implicit indication.

In a twenty-fifth aspect, in combination with one or more of the eighteenth through twenty-fourth aspects, the indication of the one or more groupings is radio resource control (RRC) signaling indicating, for each control channel resource, an associated spatial relation. The control channel resources having a same indicated spatial relation indicates a grouping.

In a twenty-sixth aspect, in combination with one or more of the eighteenth through twenty-fifth aspects, the BS sends an indication of one or more updated spatial relations and the BS receives, for each updated spatial relation, one or more previously indicated spatial relations or one or more PUCCH identifiers (IDs) associated with at least one grouping of the one or more of the groupings.

In a twenty-seventh aspect, in combination with one or more of the eighteenth through twenty-sixth aspects, sending the one or more previously indicated spatial relations or one or more PUCCH IDs includes sending a plurality of previously indicated spatial relations or a plurality of PUCCH IDs associated with a plurality of groupings for at least one updated spatial relation indication.

In a twenty-eighth aspect, in combination with one or more of the eighteenth through twenty-seventh aspects, the indication of the one or more groupings includes radio resource control (RRC) signaling indicating, for each control channel resource, an associated group identifier (ID). The control channel resources having a same indicated group ID implicitly indicates a grouping.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in one or more of FIGS. 4-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving radio resource control (RRC) signaling configuring one or more groupings of physical uplink control channel (PUCCH) resources, each grouping being associated with a plurality of PUCCH resources;
receiving a medium access control (MAC) control element (CE) including a PUCCH identifier (ID) of a PUCCH resource in a grouping of the one or more groupings of PUCCH resources and an updated spatial relation; and
applying, based on receiving the PUCCH ID of the PUCCH resource, the updated spatial relation to the plurality of PUCCH resources in the grouping of the one or more groupings of PUCCH resources.

2. The method of claim 1, wherein at least one of the one or more groupings of PUCCH resources comprises a subset of one or more control channel resources within a configured bandwidth.

3. The method of claim 1, wherein the one or more groupings of PUCCH resources comprise PUCCH resources from within a bandwidth part (BWP).

4. The method of claim 1, wherein the RRC signaling configuring the one or more groupings of PUCCH resources comprises an indication of a same associated spatial relation, for each PUCCH resource of the plurality of PUCCH resources, and wherein the plurality of PUCCH resources being associated with the same indicated spatial relation implicitly indicates a grouping.

5. The method of claim 1, wherein each of the plurality of PUCCH resources in the one or more groupings of PUCCH resources is associated with a PUCCH ID, wherein the RRC signaling configuring the one or more groupings of PUCCH resources comprises an indication of a same associated group ID, for each PUCCH resource of the plurality of PUCCH resources, and wherein the plurality of PUCCH resources being associated with a same indicated group ID implicitly indicates a grouping.

6. The method of claim 1, wherein the RRC signaling further configures a plurality of spatial relations, and wherein the updated spatial relation is one of the plurality of spatial relations.

7. A method for wireless communication by a base station (BS), comprising:
sending radio resource control (RRC) signaling configuring a user equipment (UE) with one or more groupings of physical uplink control channel (PUCCH) resources, each grouping being associated with a plurality of PUCCH resources; and
sending a medium access control (MAC) control element (CE) to the UE including a PUCCH identifier (ID) of a PUCCH resource in a grouping of the one or more groupings of PUCCH resources and an updated spatial relation to be applied to the plurality of PUCCH resources in the grouping based on the PUCCH ID of the PUCCH resource.

8. The method of claim 7, wherein at least one of the one or more groupings of PUCCH resources comprises a subset of one or more control channel resources within a configured bandwidth.

9. The method of claim 7, wherein the one or more groupings of PUCCH resources comprises PUCCH resources from within a bandwidth part (BWP).

10. The method of claim 7, wherein the RRC signaling configuring the one or more groupings of PUCCH resources comprises an indication of a same associated spatial relation, for each PUCCH resource of the plurality of PUCCH resources, and wherein the plurality of PUCCH resources being associated with the same indicated spatial relation implicitly indicates a grouping.

11. The method of claim 7, wherein each of the plurality of PUCCH resources in the one or more groupings of PUCCH resources is associated with a PUCCH ID, wherein the RRC signaling configuring the one or more groupings of PUCCH resources comprises an indication of a same associated group ID, for each PUCCH resource of the plurality of PUCCH resources, and wherein the plurality of PUCCH resources being associated with a same indicated group ID implicitly indicates a grouping.

12. The method of claim 7, wherein the RRC signaling further configures a plurality of spatial relations, and wherein the updated spatial relation is one of the plurality of spatial relations.

13. An apparatus for wireless communication, comprising:
a memory; and
at least one processor coupled with the memory, the at least one processor configured to:
receive radio resource control (RRC) signaling configuring one or more groupings of physical uplink control channel (PUCCH) resources, each grouping being associated with a plurality of PUCCH resources;
receive a medium access control (MAC) control element (CE) including a PUCCH identifier (ID) of a PUCCH resource in a grouping of the one or more groupings of PUCCH resources and an updated spatial relation; and
apply, based on receiving the PUCCH ID of the PUCCH resource, the updated spatial relation to the plurality of PUCCH resources in the grouping of the one or more groupings of PUCCH resources.

14. The apparatus of claim 13, wherein at least one of the one or more groupings of PUCCH resources comprises a subset of control channel resources within a configured bandwidth.

15. The apparatus of claim 13, wherein the one or more groupings of PUCCH resources comprises PUCCH resources from within a bandwidth part (BWP).

16. The apparatus of claim 13, wherein the RRC signaling configuring the one or more groupings of PUCCH resources comprises an indication of a same associated spatial relation, for each PUCCH resource of the plurality of PUCCH resources, and wherein the plurality of PUCCH resources being associated with the same indicated spatial relation implicitly indicates a grouping.

17. The apparatus of claim 13, wherein each of the plurality of PUCCH resources in the one or more groupings of PUCCH resources is associated with a PUCCH ID, wherein the RRC signaling configuring the one or more groupings of PUCCH resources comprises an indication of a same associated group ID, for each PUCCH resource of the plurality of PUCCH resources, and wherein the plurality of PUCCH resources being associated with a same indicated group ID implicitly indicates a grouping.

18. The apparatus of claim 13, wherein the RRC signaling further configures a plurality of spatial relations, and wherein the updated spatial relation is one of the plurality of spatial relations.

19. An apparatus for wireless communication, comprising:
a memory; and
at least one processor coupled with the memory, the at least one processor configured to:
send radio resource control (RRC) signaling configuring a user equipment (UE) with one or more groupings of physical uplink control channel (PUCCH) resources, each grouping being associated with a plurality of PUCCH resources; and
send a medium access control (MAC) control element (CE) to the UE including a PUCCH identifier (ID) of a PUCCH resource in a grouping of the one or more groupings of PUCCH resources and an updated spatial relation to be applied to the plurality of PUCCH resources in the grouping based on the PUCCH ID of the PUCCH resource.

20. The apparatus of claim 19, wherein at least one of the one or more groupings of PUCCH resources comprises a subset of one or more control channel resources within a configured bandwidth.

21. The apparatus of claim 19, wherein the one or more groupings of PUCCH resources comprises PUCCH resources from within a bandwidth part (BWP).

22. The apparatus of claim 19, wherein the RRC signaling configuring the one or more groupings of PUCCH resources comprises an indication of a same associated spatial relation, for each PUCCH resource of the plurality of PUCCH resources, and wherein the plurality of PUCCH resources being associated with the same indicated spatial relation implicitly indicates a grouping.

23. The apparatus of claim 19, wherein each of the plurality of PUCCH resources in the one or more groupings of PUCCH resources is associated with a PUCCH ID, wherein the RRC signaling configuring the one or more groupings of PUCCH resources comprises an indication of a same associated group ID, for each PUCCH resource of the plurality of PUCCH resources, and wherein the plurality of PUCCH resources being associated with a same indicated group ID implicitly indicates a grouping.

24. The apparatus of claim 19, wherein the RRC signaling further configures a plurality of spatial relations, and wherein the updated spatial relation is one of the plurality of spatial relations.

25. An apparatus for wireless communication, comprising:
means for receiving radio resource control (RRC) signaling configuring one or more groupings physical uplink control channel (PUCCH) resources, each grouping being associated with a plurality of PUCCH resources;
means for receiving a medium access control (MAC) control element (CE) including a PUCCH identifier (ID) of a PUCCH resource in a grouping of the one or more groupings of PUCCH resources and an updated spatial relation; and
means for applying, based on receiving the PUCCH ID of the PUCCH resource, the updated spatial relation to the plurality of PUCCH resources in the grouping of the one or more groupings of PUCCH resources.

26. The apparatus of claim 25, wherein at least one of the one or more groupings of PUCCH resources comprises a subset of one or more control channel resources within a configured bandwidth.

27. The apparatus of claim 25, wherein the RRC signaling further configures a plurality of spatial relations, and wherein the updated spatial relation is one of the plurality of spatial relations.

28. A non-transitory computer readable medium storing computer executable code for wireless communication, comprising:
code for receiving radio resource control (RRC) signaling configuring one or more groupings of physical uplink control channel (PUCCH) resources, each grouping being associated with a plurality of PUCCH resources;
code for receiving a medium access control (MAC) control element (CE) including a PUCCH identifier (ID) of a PUCCH resource in a grouping of the one or more groupings of PUCCH resources and an updated spatial relation; and
code for applying, based on receiving the PUCCH ID of the PUCCH resource, the updated spatial relation to the plurality of PUCCH resources in the grouping of the one or more groupings of PUCCH resources.

29. The non-transitory computer readable medium of claim 28, wherein at least one of the one or more groupings of PUCCH resources comprises a subset of one or more control channel resources within a configured bandwidth.

30. The non-transitory computer readable medium of claim 28, wherein the RRC signaling further configures a plurality of spatial relations, and wherein the updated spatial relation is one of the plurality of spatial relations.

31. An apparatus for wireless communication by an access node, comprising:
a memory; and
at least one processor coupled with the memory, the at least one processor configured to:
send radio resource control (RRC) signaling configuring one or more groupings of physical uplink control channel (PUCCH) resources, each grouping being associated with a plurality of PUCCH resources; and
send a medium access control (MAC) control element (CE) including a PUCCH identifier (ID) of a PUCCH resource in a grouping of the one or more groupings of PUCCH resources and an updated spatial relation to be applied to the plurality of PUCCH resources in the grouping based on the PUCCH ID of the PUCCH resource.

32. The apparatus of claim 31, wherein at least one of the one or more groupings of PUCCH resources comprises a subset of one or more control channel resources within a configured bandwidth.

33. The apparatus of claim 31, wherein the RRC signaling further configures a plurality of spatial relations, and wherein the updated spatial relation is one of the plurality of spatial relations.

* * * * *